United States Patent Office 3,519,516
Patented July 7, 1970

3,519,516
METHOD FOR BONDING SILOXANE RUBBER-BASE VULCANIZATES USING A POLYSILAZANE ADHESIVE
Dmitry Yakovlevich Zhinkin, 5 Parkovaya ul. 56, korp. 6; Antonina Matveevna Medvedeva, Ul. Epremova 12, kv. 46; Zinovy Naumovich Nudelman, Ul. Zverinetskaya 12, kv. 43; and Tatiana Borisovna Ilina, Ul. Mashi Poryvaevoi 16, kv. 47, all of Moscow, U.S.S.R.
No Drawing. Filed Feb. 17, 1967, Ser. No. 616,782
Int. Cl. C09j 5/00
U.S. Cl. 156—329
1 Claim

ABSTRACT OF THE DISCLOSURE

A cold adhesive bonding method is provided in which a substitute polysilazane adhesive is applied to the surface of at least one of two specimens to be bonded together, one specimen being a siloxane rubber-base vulcanizate, the second specimen being the same vulcanizate, or a metal, or a metal alloy. The specimens are clamped together under pressure for 2 to 48 hours at a temperature of 10 to 40° C. The substituted polysilazane adhesive has the formula $$[R_{4-n}Si(NY)_{n/2}]_x$$

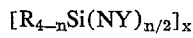

wherein: R represents the same or different radicals selected from the group consisting of alkyl, alkenyl, cycloalkyl, or aryl radicals; Y is a substituent at the nitrogen atom selected from the group consisting of hydrogen and $R_{4-n}Si$; $n$ is 2 or 3, and $x$ is an integer greater than unity.

---

This invention relates to methods for cold adhesive bonding of vulcanizates.

Known is a method for cold adhesive bonding of siloxane rubber vulcanizates with other materials, such as metals or a siloxane rubber vulcanizate, which involves the use of an organosilicon adhesive consisting of a fluid polydimethylsiloxane, a filler, and methyltriacetoxysilane.

The known method suffers from the disadvantage of not providing an adequate bonding strength between said vulcanizates and metals and also of the necessity of applying a backing to the metal prior to bonding.

The known method also has a disadvantage in that the acetic acid, liberated in the course of bonding as a result of the adhesive setting, causes corrosion of metals and also is objectional to the personnel due to its obnoxious smell.

It is an object of the present invention to provide a method of cold adhesive bonding of vulcanizates that will make it possible to obtain adequately strong adhesion between vulcanizates and metals without applying a backing onto the metals.

It is another object of the present invention to provide a method of cold adhesive bonding of vulcanizates that will make it possible to dispense with acetic acid.

In accordance with these and other objects, the present invention consists in employing an adhesive which comprises substituted polysilazanes of the general formula $$[R_{4-n}Si(NY)_{n/2}]_x$$

wherein:

R represents similar or dissimilar radicals selected from the group consisting of alkyl, alkenyl, cycloalkyl, or aryl radicals;
Y is hydrogen or $R_{4-n}Si$,
$n$ is 2 or 3, and
$x$ is an integer greater than unity.

The method of the present invention is accomplished as follows.

A thin coat of substituted polysilazane or a solution thereof, e.g. a solution of polysilazane in toluene is applied onto the cleaned and degreased surface of a material, such as a metal, then bonded is placed on the material and pressure is applied to the assembled joint for a period of 2 to 48 hours, preferably for 24 hours, at a temperature of 10° to 40° C., preferably at 18° to 25° C.

For a better understanding of the present invention by those skilled in the art the following examples are presented by way of illustration.

EXAMPLE 1

A thin coat of a 70% solution of methylvinylsilazane is applied on the cleaned and degreased surface of a duraluminum specimen, then on the specimen a degreased vinylsiloxane rubber-base vulcanizate containing white soot as the filler is placed and the vulcanizate is covered with an adhesive-coated duraluminum specimen which is identical to the first duraluminum specimen. The specimens are then clamped, the specific pressure being about 0.2 kg./cm.$^2$, and maintained at a temperature of 18° to 25° C. for a period of 2 days, after which time the vulcanizate-to-metal bonding strength is tested.

At a temperature of 20° C., the tear strength amounts to 20.0 kg./cm.$^2$, while at a temperature of 200° C. the tear strentgh is 10.6 kg./cm.$^2$. In either case, the vulcanizate is the component that fails.

EXAMPLE 2

A thin coat of methylvinylsilazane is applied onto the cleaned and degreased surface of a steel specimen, a degreased vinylsiloxane rubber-base vulcanizate containing aeroxil as the filler is then placed on the specimen and is covered with an adhesive-coated steel specimen which is identical to the first steel specimen. The specimens are then clamped, the specific pressure being about 0.2 kg./cm.$^2$ and maintained at a temperature of 18° to 25° C. for a period of 2 days, after which time the vulcanizate-to-metal bonding strength is tested.

At a temperature of 20° C., the tear strength of the adhesive-bonded assembly equals 29 kg./cm.$^2$, while at a temperature of 200° C. it amounts to 13.5 kg./cm.$^2$. In either case, the vulcanizate is the assembly element that fails.

EXAMPLE 3

A thin coat of 70% solution of methylvinylsilazane is applied onto a degreased vinylsiloxane rubber-base vulcanizate containing white soot as the filler, and the vulcanizate is covered with an identical degreased vulcanizate specimen also coated with a thin layer of said methylvinylsilazane solution. The vulcanizate specimens are clamped together, the specific pressure being 0.2 kg./cm.$^2$, and maintained at a temperature of 18° to 25° C. for a period of 2 days, after which time the vulcanizate-to-vulcanizate bonding strength is tested.

At a temperature of 20° C., the peeling strength equals 13 kg./cm.$^2$, the vulcanizate being the element of the adhesive-bonded assembly that fails.

The experiments involving the use of other substituted polysilazanes, such as methylsilazane or phenylsilazane, are carried out by following the procedure disclosed in the above examples.

Although the present invention has been described in accordance with a preferred embodiment thereof, it will be readily understood by those skilled in the art that various changes and modifications may be made in carrying out the present invention without departing from the spirit and scope thereof.

We claim:
1. A method of cold adhesive bonding of siloxane rubber-base vulcanizates to one another or to a metal or a

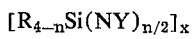

metal alloy, said method comprising applying a substituted polysilazane adhesive to at least one of two specimens to be bonded together, a first of the specimens being a siloxane rubber-base vulcanizate, the second specimen being the same vulcanizate or a metal or a metal alloy, clamping the specimens together under pressure for 2 to 48 hours at a temperature of 10 to 40° C., said substituted polysilazane adhesive having the formula $$[R_{4-n}Si(NY)_{n/2}]_x$$

wherein: R represents the same or different radicals selected from the group consisting of alkyl, alkenyl, cycloalkyl, or aryl radicals; Y is a substituent at the nitrogen atom selected from the group consisting of hydrogen and $R_{4-n}Si$: $n$ is 2 or 3, and $x$ is an integer greater than unity.

References Cited

UNITED STATES PATENTS

| | | | |
|---|---|---|---|
| 3,318,757 | 5/1967 | Atwell | 156—329 X |
| 3,360,425 | 12/1967 | Boone | 156—329 X |
| 3,428,599 | 2/1969 | Newing | 156—329 X |

BENJAMIN R. PADGETT, Primary Examiner

S. J. LECHERT, JR., Assistant Examiner

U.S. Cl. X.R.

161—206, 207, 213